(12) United States Patent
Elizondo et al.

(10) Patent No.: US 11,019,200 B2
(45) Date of Patent: *May 25, 2021

(54) CONTROLLING A GRAPHICAL USER INTERFACE FOR WORKFLOW

(71) Applicant: Hartford Fire Insurance Company, Hartford, CT (US)

(72) Inventors: Samantha Jaszczuk Elizondo, Helotes, TX (US); Taylor Knight Brawner, Cumming, GA (US); Andres Pelaez, Westfield, IN (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,940

(22) Filed: Mar. 23, 2020

(65) Prior Publication Data

US 2020/0220970 A1 Jul. 9, 2020

Related U.S. Application Data

(63) Continuation of application No. 15/277,348, filed on Sep. 27, 2016, now Pat. No. 10,623,555.

(51) Int. Cl.
*H04M 3/00* (2006.01)
*H04M 5/00* (2006.01)
(Continued)

(52) U.S. Cl.
CPC ........ *H04M 3/22* (2013.01); *G06Q 10/06316* (2013.01); *H04M 3/5175* (2013.01);
(Continued)

(58) Field of Classification Search
CPC ........... H04M 1/72572; H04M 3/5183; H04M 1/72522; H04M 1/72525; H04M 3/493; H04M 3/51; H04M 1/72561; H04M 3/42059; H04M 3/4931; H04M 3/42042; H04M 3/5166; H04M 2201/42;
(Continued)

(56) References Cited

U.S. PATENT DOCUMENTS 6,279,017 B1 * 8/2001 Walker ................. G06F 40/211
715/201
9,420,099 B1 * 8/2016 Krishnan ............. H04M 3/5116
(Continued)

*Primary Examiner* — Ahmad F. Matar
*Assistant Examiner* — Kharye Pope
(74) *Attorney, Agent, or Firm* — Ference & Associates LLC

(57) ABSTRACT

Embodiments provide a method for providing a call center supplemental workflow tool, including: receiving from a database a workflow decisional matrix, a plurality of questions, and a plurality of scripts; displaying a web-based graphical user interface on a display providing at least one question or one script; receiving user input; determining, at least another question or at least another script, to be displayed, wherein determining is based upon the user input and the decisional matrix and advances the workflow; based upon the decisional matrix, determining that the workflow has been completed; providing an output of the questions displayed and the user input received; and the output being provided to a primary software application. Other aspects are described and claimed.

20 Claims, 8 Drawing Sheets

(51) Int. Cl.
*H04M 3/22* (2006.01)
*G06Q 10/06* (2012.01)
*H04M 3/51* (2006.01)

(52) U.S. Cl.
CPC .. *H04M 2201/42* (2013.01); *H04M 2203/357* (2013.01); *H04M 2203/401* (2013.01)

(58) Field of Classification Search
CPC ............. H04M 3/5125; H04M 3/5133; H04M 3/5175; H04M 11/04; H04M 3/42161; H04W 4/90; H04W 76/50; H04W 4/02; H04W 4/029; G08B 25/016; G08B 25/10; G08B 25/006; G08B 25/001; G08B 21/02; G08B 21/043; G08B 19/00; G08B 21/0241; G08B 21/10
USPC ...... 379/45, 142.01, 201.01, 265.11, 37, 38; 455/404.2, 404.1, 456.1, 521; 370/352
See application file for complete search history.

(56) References Cited

U.S. PATENT DOCUMENTS

| | | | |
|---|---|---|---|
| 2005/0193055 A1* | 9/2005 | Angel | G06Q 30/02 709/202 |
| 2005/0268215 A1* | 12/2005 | Battagin | G06F 40/18 715/209 |
| 2007/0025543 A1* | 2/2007 | Vadlakonda | H04M 3/5237 379/265.02 |
| 2007/0116189 A1* | 5/2007 | Clawson | H04M 11/04 379/37 |
| 2008/0120142 A1* | 5/2008 | Jakobovits | G06Q 50/24 705/3 |
| 2008/0310600 A1* | 12/2008 | Clawson | G06Q 50/22 379/45 |
| 2011/0208660 A1* | 8/2011 | Erbey | H04M 3/51 705/304 |
| 2014/0211927 A1* | 7/2014 | Clawson | H04M 3/493 379/45 |
| 2014/0370841 A1* | 12/2014 | Roberts | H04M 1/72536 455/404.2 |
| 2017/0060830 A1* | 3/2017 | Liao | G06F 40/186 |

* cited by examiner

FIG. 2

302 — Documentation other than certification of healthcare provider needed?
● Yes
○ No 304 — "Now that we have your information, I will go over a few steps with you. You will need to provide documents supporting your claim by (insert date) or you claim may be denied. Will give me your permission to send medical requests to your PCP and surgeon?" [if the answer is yes, thank the caller][if the answer is no, explain to the caller that this information is required to process the claim]

306 — Did the employee provide the necessary consent to reach out to the provider if clarification or authentication is needed?
● Yes
○ No

FIG. 3

| | A | B | C | D | E | F | G | H |
|---|---|---|---|---|---|---|---|---|
| 1 | 1 | Are we speaking with the employee? | Yes | 3 | No | 2 | 3 | |
| 2 | 2 | Text Box Open for caller information | | 3 | | | | |
| 3 | 3 | Is this for a new leave? | Yes | 4 | No | 72 | | |
| 4 | 4 | Is this for your own condition or to care for someone else? | Self | 5 | Other | 45 | | |
| 5 | 5 | What type of leave is this? | Continuous | 83 | Intermittent Leave | 13 | Reduced Work Schedule | |
| 6 | 6 | May we have your authorization to leave confidential medical and leave information on your personal cell phone? | Yes | 7 | No | 7 | | |
| 7 | 7 | Was leave reported timely? | Yes | 9 | No | 8 | 9 | |
| 8 | 8 | Why not timely? | | 9 | | | | |
| 9 | 9 | Documentation other than certification of healthcare provider needed? | Yes | 10 | 12 | No | 11 | 12 |
| 10 | 10 | Now that we have your information, I will go over a few steps with you… | | | | | | |
| 11 | 11 | Now that we have your information, I will go over a few steps with you… | | | | | | |
| 12 | 12 | Did the employee provide the necessary consent to reach out to the provider if clarification or authentication is needed? | Yes | 50 | No | 99 | | |

FIG. 6

CONTROLLING A GRAPHICAL USER INTERFACE FOR WORKFLOW

CROSS REFERENCE TO RELATED APPLICATIONS

This application is a continuation application of U.S. patent application Ser. No. 15/277,348, entitled CONTROLLING A GRAPHICAL USER INTERFACE FOR WORKFLOW, filed on Sep. 27, 2016, the contents of which are incorporated by reference entirely herein.

FIELD

Embodiments as described herein relate generally to design and control of graphical user interfaces.

BACKGROUND

Workflows describe step-by-step procedures, e.g., how an employee may accomplish an assigned work task from start to finish. Employees in a company may be required to perform any number of different workflow processes. A workflow might relate to intake of necessary information for personnel matters, such as hiring, medical leave requests, and the like.

An example workflow might be a process that is routed through an employer call center where call center employees collect the initial intake information from a caller. To guide the call center employee, an employer might require a workflow process that includes the steps of asking the caller a series of scripted questions. There may be some initial questions required to assist the call center employee in determining what workflow should be followed.

After determining the necessary workflow, a call center worker might then follow a step-by-step scripted series of questions and comments guiding the worker to collect the necessary information to complete the intake of information that is the subject of the workflow process. Answers to questions might be typed into a computer spreadsheet or database. Conventionally, call center employees following such a workflow are not automatically prompted to ask the next question and may be required to enter duplicate information in multiple locations. The call center employee might then be required to enter the collected information into a separate paper form, computer spreadsheet or database not compatibly formatted with the original collection form.

Consequently, the current process of intake of information following a given workflow may lead to call center employee errors such as failing to remember to ask relevant and necessary questions or miscopying already correct information into a different location. The workflow is not automatically responsive to information received. Changing the workflow steps may require additional revisions and supplementing that may further complicate the call center employee's task. Also, the workflow for intake of information is very inefficient and not user friendly for an employee attempting to follow the workflow.

BRIEF SUMMARY

In summary, an embodiment provides a system for providing a web-based graphical user interface for workflow. The system may include a processor that executes a program of instructions to receive, from an input device, user input responding to at least one of a plurality of questions displayed in a web-based graphical user interface, wherein the graphical user interface, responsive to user input, displays additional questions or scripted text.

An embodiment provides a system having a graphical user interface for providing a supplemental call center web-based workflow tool, the system comprising: a display device; an input device; a database that stores a decisional matrix, a plurality of questions, and a plurality of scripts related to a workflow; a processor coupled to the database, the display device, and the input device; and the display device providing a web-based graphical user interface for providing a call center supplemental workflow tool; wherein the processor receives from the database: the workflow decisional matrix, the plurality of questions, and the plurality of scripts related to the workflow; the graphical user interface providing at least one element selected from the group consisting of: at least one question selected from the plurality of questions and at least one script selected from the plurality of scripts; the graphical user interface receiving user input through the input device responsive to the at least one element; the processor determining, at least another element selected from the group consisting of: another at least one question and another at least one script, to be displayed on the graphical user interface, wherein the at least another element is determined based upon the received user input and the decisional matrix and advances the workflow; the processor, based upon the decisional matrix, determining that the workflow has been completed; the graphical user interface providing an output of the questions displayed and user input received; and the output being provided to a primary software application.

An additional embodiment provides a method providing a web-based graphical user interface for providing a call center supplemental workflow tool, comprising: receiving from a database a workflow decisional matrix, a plurality of questions, and a plurality of scripts related to the call center workflow; displaying a web-based graphical user interface on a display providing at least one element selected from the group consisting of: at least one question selected from the plurality of questions and at least one script selected from the plurality of scripts; the graphical user interface receiving user input responsive to the at least one element; determining, at least another element selected from the group consisting of: another at least one question and another at least one script, to be displayed on the graphical user interface, wherein the at least another element is determined based upon the received user input and the decisional matrix and advances the workflow; based upon the decisional matrix, determining that the workflow has been completed; the graphical user interface providing an output of the questions displayed and the user input received; and the output being provided to a primary software application.

A further embodiment provides system having a graphical user interface for providing a call center supplemental workflow tool comprising: a database comprising a workflow decisional matrix, a plurality of questions, and a plurality of scripts related to the workflow; a display device providing a web-based graphical user interface, wherein the graphical user interface provides at least one element selected from the group consisting of: at least one question selected from the plurality of questions and at least one script selected from the plurality of scripts; the graphical user interface receiving user input responsive to the at least one element; a processor determining, at least another element selected from the group consisting of: another at least one question and another at least one script, to be displayed on the web-based graphical user interface, wherein the at least another element is determined based upon the received user input and the decisional matrix and advances the workflow; the processor, based upon the decisional matrix, determining that the workflow has been completed; the graphical user interface providing an output of the questions displayed and user input received; and the output being provided to a primary software application.

Additional embodiments are described, including other methods, as well as devices/apparatuses, systems including multiple devices, and products.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2 illustrates an example graphical user interface according to an embodiment.

FIG. 3 illustrates an example graphical user interface according to an embodiment.

FIG. 6 illustrates an example decisional matrix according to an embodiment.

DETAILED DESCRIPTION

Figure 1:
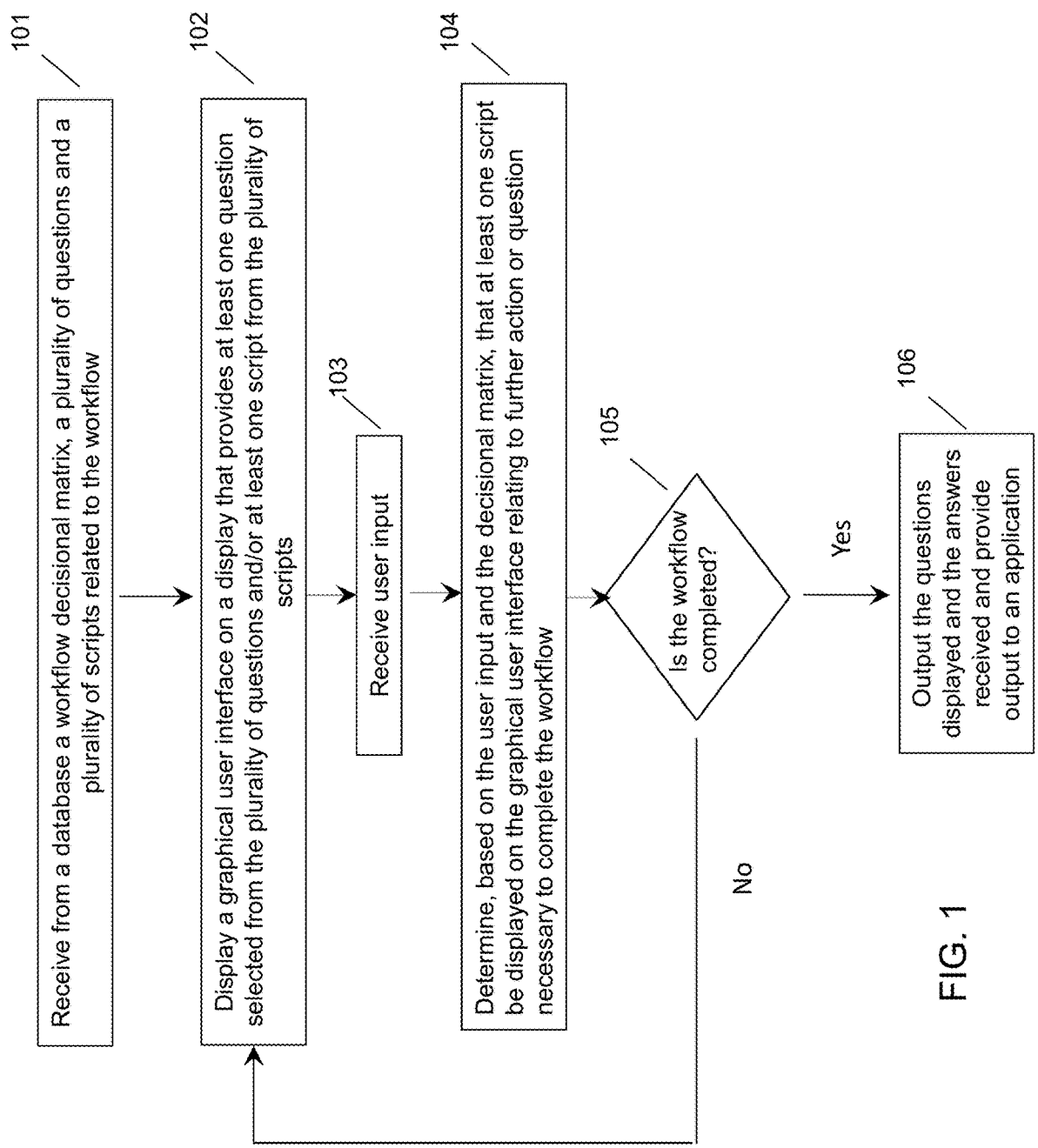
FIG. 1 illustrates a flow diagram of an example method of controlling a graphical user interface for workflow according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

A technical improvement provided by an embodiment is that a supplemental information intake process which is part of a larger process may be quickly revised and updated as desired. The desired questions and scripts for the supplemental information intake process are stored in a spreadsheet in a format that may be easily understood. The spreadsheet then may be accessed by an HTML (hypertext markup language) compatible browser that controls a graphical user interface on a display. The improved supplemental information intake system reduces system down time or interruption of the primary system to change supplemental data elements and flows, reduces data definition conflicts by isolating the supplemental system data from the primary system database, and minimizes the size of data responses by using the decision matrix to help improve overall system performance.

Another technical improvement provided by an embodiment is that a graphical user interface is programmed to prompt a call center employee to ask only the necessary information to complete a particular information intake responsive to information received in a prior question, thus preventing the call center employee from forgetting to ask the pertinent information and follow up questions. A further technical improvement in an embodiment is that a graphical user interface is programmed to present a call center employee with the relevant portion of the questions, at predetermined times, as well as scripted responses and explanations pertinent to the complete a task that is the subject of the workflow, thus making the task of information intake less confusing, quicker, more efficient and more user friendly.

Another technical improvement in an embodiment is that graphical user interface is programmed to automate data collection so that a call center employee is not required to enter redundant information into multiple locations and forms, thus eliminating the possibility of transcription errors. A further technical improvement in an embodiment is that a graphical user interface receives user inputs and generates an ordered output suitable for receiving by a separate system (i.e., a primary software application), without re-formatting. A technical improvement is that an embodiment provides a simplified output, which provides easier viewing and reading.

Embodiments describe that a particular workflow (i.e., a step-by-step process) may be described in a decisional matrix. In one non-limiting example, the decisional matrix describing a plurality of decisional paths may be stored in a spreadsheet format (i.e., EXCEL spreadsheet format, a registered trademark of Microsoft Corp. in the United States or NUMBERS spreadsheet format, a registered trademark of Apple, Inc. in the United States) or any other suitable spreadsheet or database system. The decisional matrix may include questions and scripted responses relevant to a particular workflow. Using a conversion program, the decisional matrix may be exported in a format suitable for loading a web-based browser. For example, the matrix may be loaded as part of the components that the browser pulls when the web site is loaded. An EXCEL file in which the decision matrix is stored may be converted using JavaScript to export it to a son file type, which then structures within the HTML programming language how the HTML browser pulls the information into the browser and drives a graphical user interface to display the required questions and scripts for the information intake process. In this way, the matrix may control the sequence in which the questions and scripts appear in the graphical user interface displayed in the browser.

It will be appreciated that by merely modifying the decisional matrix stored in the spreadsheet and converting it into an HTML readable file for loading into the HTML web browser, the web-based browser may execute an updated series of questions and scripts and this efficient modification is a technical improvement of an embodiment. A technical improvement is that by using an embodiment simply altering the spreadsheet permits a quick change to the supplemental information intake process without modifying the larger process by a person who may not have significant computer programming expertise.

The description now turns to non-limiting example embodiments of systems, methods and products, as applied to an employee leave management system. An embodiment provides that a graphical user interface web-based tool mimics decision paths that the frontline staff of a call center may use to decipher which leave information, questions, and scripting may be necessary to pull from a database in which the decisional matrix is stored. By displaying only the relevant information, questions, and scripting, the staff remains consistent in conducting intake of information for each leave situation and reduces talk time, i.e., since the staff are no longer attempting to scan through all the various leave situations to determine which questions and scripting applies to their call. For further efficiency, when creating the decisional matrix stored in the database, necessary questions are not duplicated.

Turning now to FIG. 1, a flow chart of an example method is shown. At 101, the web browser receives from a database a workflow decisional matrix, a plurality of questions and a plurality of scripts related to the workflow. The data stored in the database may be converted to a format suitable for loading by the web browser. Embodiments provide that any suitable method for converting the data is contemplated. At 102, a graphical user interface displays at least one question selected from a plurality of questions or at least one script from the plurality of scripts, i.e., according to the decisional matrix.

At 103 user input is received. The user input may be received from any suitable user interface including but not limited to a keyboard, a mouse, a stylus, a touch sensitive screen, and the like. At 104, based upon the user input and decisional matrix that was loaded into the browser, at least one script or additional question is displayed on the graphical user interface relating to a further action or question necessary to complete the workflow. The user input, e.g., to a radio button within the graphical user interface, may be recorded, with or without conversion, e.g., association of text of the radio button selection made.

At 105, by analyzing the user input and the decisional matrix, a determination is made as to whether the workflow has been completed. If the workflow is not complete, the method returns to 102 displaying another question or script as dictated by the decisional matrix. If the workflow is complete, then at 106 the graphical user interface provides an output of the questions displayed and the answers received and the processor provides the output to a different application (i.e., a primary software application). This output may be suitable for copying from the screen into another computer database, for example, claims notes for an employee leave management system. By providing characters in simple format (i.e., courier or other unembellished fonts) the output is suitable for a variety of uses including parsing and text mining in order to create an employer wide census report. By automatically providing the output to an application, the possibility of new errors being introduced during copying or transcription into the application is eliminated. Additionally, the system is more efficient because user input is only entered once.

Figure 2:
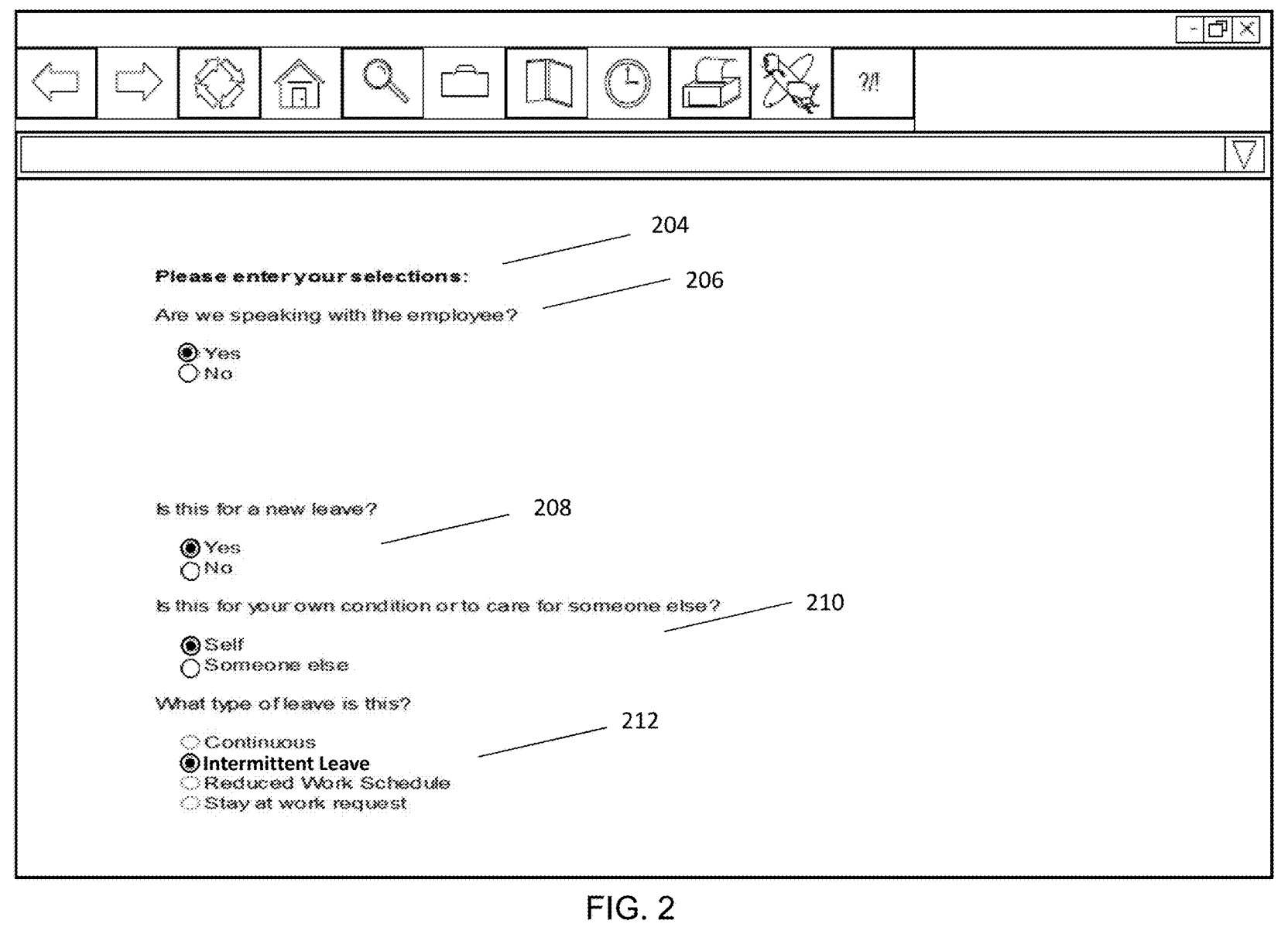

At FIG. 2 an example embodiment provides a call center supplemental workflow tool using a graphical user interface for employee leave system information intake. In this example a call center employee receives a telephone call from an individual who is initiating a leave request on behalf of another employee. At 204, a call center employee is prompted by a graphical user interface running on a web browser to enter a selection. The graphical user interface may be loaded into a memory of an electronic device and displayed automatically on receipt of the phone call.

At 206, the employee has received and entered the information from the caller that the caller is the employee requesting leave. It will be appreciated that since the only answer to this questions is "Yes" or "No", the question is presented in a "toggle-style" format so that only the appropriate information may be entered. Embodiments provide that other styles of prompts may also be used.

Though not depicted in this example because the employee is the caller, an optional input method is a text box seeking additional required information from the call center employee if the caller is not the employee. Based upon the desired workflow, such a text box may appear and prompt the call center employee to collect and enter additional identifying information from the caller. Indeed, in FIG. 6, an example of the logical programming which might cause a text box to open for caller information is shown in row 2, columns B-D. It will be appreciated that the information entered into the box by the call center employee may be validated before the call center employee is further prompted or capable of progressing through the workflow, e.g., based upon the decision path pulled from the decision matrix. For example, the received user input might be checked to ensure that it falls within a certain numeric range. It might be parsed to determine that a minimum number of alphanumeric characters were entered. It might be checked against a database of acceptable responses. If the user input is determined not to be valid, the graphical user interface may notify the call center employee that the input was not valid and might offer a reason the input was not valid and prompt the call center employee to enter a different response. Another way to accomplish the receipt of valid user input is to use a series of radio buttons with valid responses to a particular prompt or question. It will be appreciated by those skilled in the art that the process of validating input may be accomplished using any suitable means and these examples are not intended to be limiting in scope.

Next at 208, e.g., responsive to receiving the information requested at 206, the decision matrix causes the graphical user interface to display the question "Is this for a new leave?" Also, as part of the logical programming, the graphical user interface displays a radio button to the left of "Yes" and a radio button to the left of "No". In this example, the call center employee selects the radio button next to "Yes". Next, at 210, responsive to the information that this is a new leave request, the decision matrix causes the graphical user interface to display the question "Is this for your own condition or to care for someone else?" Consistent with the logical programming, the graphical user interface provides a radio button to the left of "Self" and a radio button to the left of "Someone else". In this example, the call center employee selects "Self". Next, at 212, responsive to the information that the leave is for the employee's own condition, the decision matrix causes the graphical user interface to display the question "What type of leave is this?" Also, as part of the logical programming, the graphical user interface displays a radio button to the left of "Continuous", a radio button to the left of "Intermittent Leave", a radio button to the left of "Reduced Work Schedule" and a radio button to the left of "Stay at work request". In this example, the call center employee selects "Intermittent Leave". Although the example in FIG. 2 ends with the selection of "Intermittent Leave", it should be understood that additional steps in a workflow as implemented in the logical programming of the decisional matrix may be executed causing the graphical user interface to display further questions and radio buttons or other prompts calling for user input. This example is not intended to be limiting or all inclusive as relates to illustrative logical programming depicted in FIG. 6 later but is intended to show a sample graphical user interface display according to a portion of the logical programming in FIG. 6.

Moreover, the graphical user interface, loaded and displayed according to the decision matrix, permits the stepwise progression through a workflow of interest. In the non-limiting example of the call center supplemental workflow, the decision path may require specific inputs, e.g., radio button input, text input, etc., prior to permitting the workflow to progress. The elements of the graphical user interface are determined by the decision matrix, and the progression of the workflow is determined by the decision path. The elements of the graphical user interface are thus retrieved, e.g., from a database, and displayed according to the specific programming applied. As will be readily understood by those having skill in the art, different decision paths and decision matrixes may be utilized for different workflows.

Now turning to FIG. 3, another example embodiment for a call center supplemental workflow tool using a graphical user interface provides for an employee leave system information intake. Due to space constraints this does not display the complete logical programming example shown in FIG. 6 but does demonstrate a sample consistent with FIG. 6. At 302, the decisional matrix causes the graphical user interface displayed on a browser to prompt a call center employee to answer the question whether "Documentation other than heath care provider certification needed? Below the question, the system presents radio buttons for Yes and No. In this example, the call center employee selects "Yes". At 304, responsive to the call center employee's answer at 302, the decisional matrix causes the graphical user interface to display a script that must be read to the caller with appropriate information inserted by the call center employee. It will be appreciated that the only script displayed to the call center employee is the script that is relevant to the necessary information intake for the particular employee leave request. This is accomplished, for example, by creating a logical association or linkage between a data structure containing the relevant script and the output produced by the employee providing the input of "Yes," indicated at 302.

At 306, following the decisional matrix loaded for the particular information intake as shown in the example in FIG. 6 and responsive to earlier information entered by the call center employee, the graphical user interface displays the question "Did the caller provide the necessary consent to reach out to the provider if clarification or authentication is needed?" The logical programming controlling the graphical user interface causes it to display a radio button to the left of the word "Yes" and a radio button to the left of the word "No". Depending on the input, the decisional matrix applies appropriate processing to the subsequent output and the workflow progresses. In this example, the call center employee has selected the radio button next to "Yes". Again, although this example ends after 306 due to space constraints, it should be understood that responsive to the input and consistent with the logical programming in a decisional matrix such as the example in FIG. 6, the graphical user interface may display additional questions, scripts, and prompts for information until the desired workflow terminates and the output is displayed as the product of all the processing and user input. The output may be provided to a primary software application.

Figure 4:
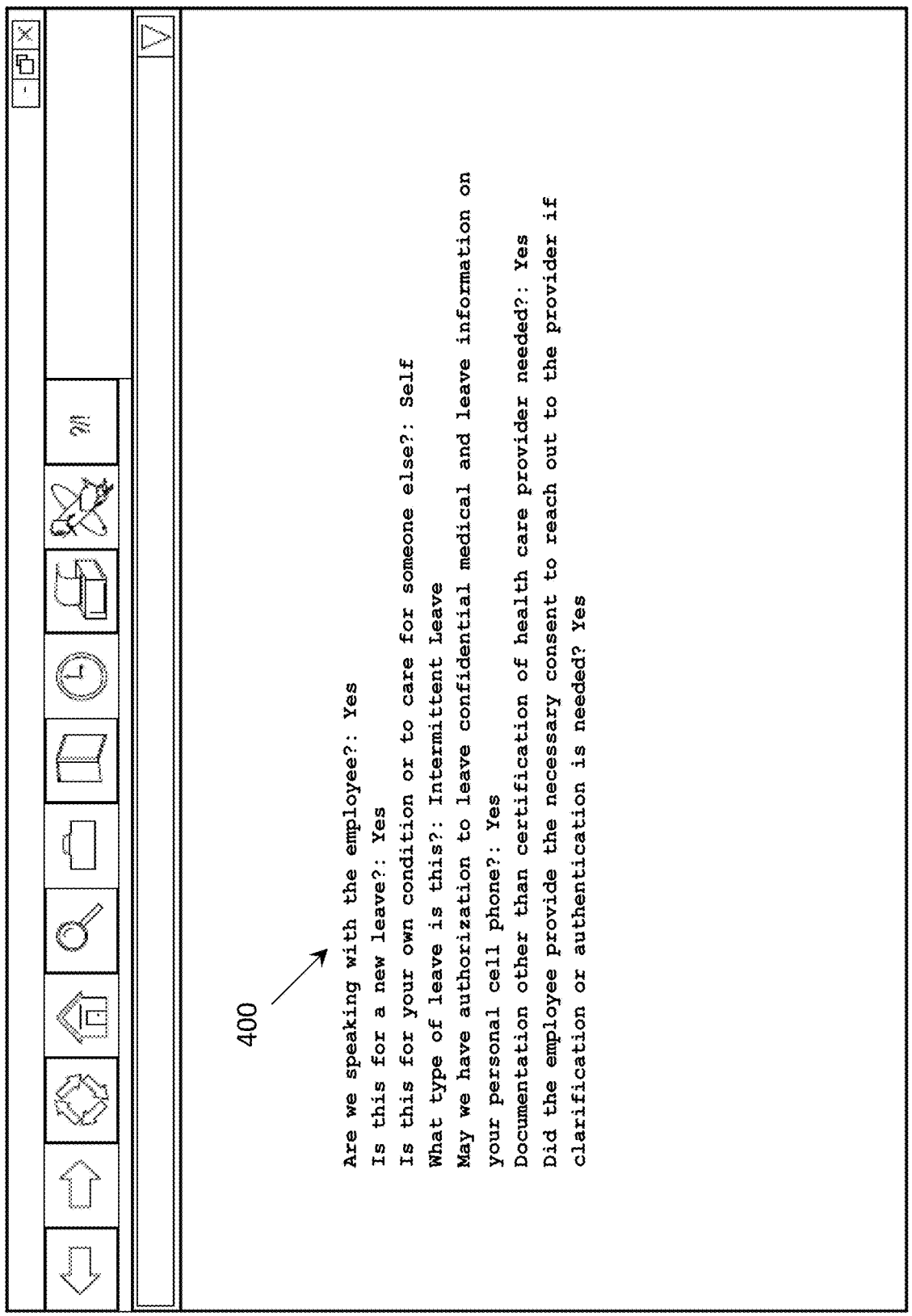
FIG. 4 illustrates an example of an automated data output of a graphical user interface according to an embodiment.

Now turning to FIG. 4, at 400 an output created by the example described in FIGS. 2 and 3 is shown. In this example, all of the questions displayed by the graphical user interface at 206, 208, 210, 212, 302, and 306 are output in simple format with each corresponding response directly next to it. Alternatively, the corresponding answers may be displayed directly below each question if that is desired for ease of data handling. It will be appreciated that only the information relevant to the particular leave request has been stored, formatted and displayed on the graphical user interface. In this example, the information has been output in a simple courier font without any additional formatting or characters. It may be copied into another system, for example a claims notes system, without duplicating effort. The ability to copy the output verbatim and paste into another program (i.e., a primary software application) eliminates transcription errors. Further, the simple output may be stored and later text mined with other similar employee leave system information that was obtained through embodiments. In that way, useful census information about employees may be analyzed and compiled. Furthermore, the decision matrix drives the potential inputs that are collected during the workflow, and thus the output of the process may be controlled.

Figure 5:
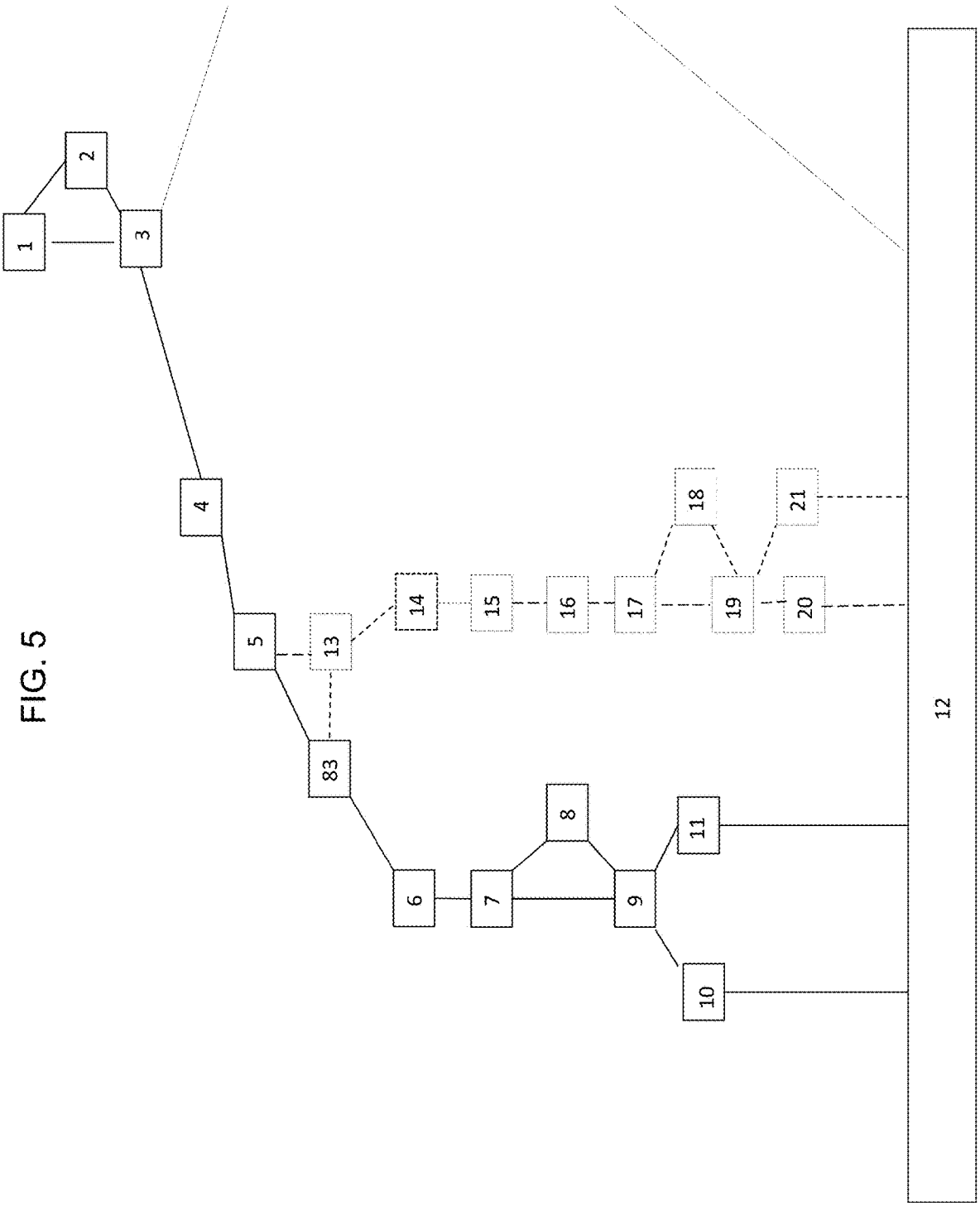
FIG. 5 illustrates an example logical tree according to an embodiment.

Now, turning to FIG. 5, an example logic tree implemented in the decisional matrix of FIG. 6 according to an embodiment is illustrated. In this non-limiting example, the logic for a particular decision tree for a workflow is depicted, however, it should be appreciated that additional decisions paths and logic trees may be constructed and incorporated and any such constructions are contemplated herein. The dotted lines and references within the boxes depicted by dotted lines (i.e., boxes 13 through 21) in FIG. 5 depict additional such paths though not specifically discussed herein.

In this example, 1 is the first step in the workflow. Each step in the workflow may be a question or script relevant to the desired workflow. Once step 1 is completed, the logic tree may proceed to either 2 or 3. Upon executing step 3, the logic tree may proceed to step 4 and then step 5. Once step 5 is completed, the logic tree may progress to step 83. From step 83, the logic tree may proceed to step 6 and then step 7. At step 7, the logic tree may either move to step 8 which then proceeds to step 9 or it may proceed directly to step 9. At step 9, the logic tree may progress to either step 10 or step 11. From either step 10 or step 11, the logic tree may progress to step 12 where this example workflow ends.

FIG. 6 is an example spreadsheet in which text and decision paths for a call center workflow are stored as a decisional matrix graphically illustrated by the example logic tree in FIG. 5. At FIG. 6, the reference letters (A-H) in the cells surrounded by dashed lines in first row and the reference numbers (1-12) surrounded by dashed lines in the first column are shown for purposes of clarification and are not part of the data used by described embodiments. The jagged lines at the bottom of the spreadsheet and to the far right indicate that additional rows and columns of data may be used in embodiments and this example is not intended to be limiting in scope.

At 610, in column A of the example spreadsheet, the number of each corresponding step is stored. At 620, in column B, the text, prompt or script that corresponds to the step number is stored. At 630, columns C through H contain the logical programming that drives the graphical user interface.

As described above, all of the data that is stored in each corresponding cell, starting with cell A1 (step 1) in the spreadsheet is converted into a single j son file. Then, once the HTML browser is running, the .json file data is converted through JavaScript and read by an HTML browser, which causes the graphical user interface to progress step-by-step through the workflow to display the text or script or prompt required by the programmed logic depicted by the decisional matrix shown in FIG. 6.

Continuing, the corresponding text or prompt or script for each step is stored in the same spreadsheet row along with possible responses and the next steps required based upon those responses. For example, in cell B1, the text "Are we speaking with the employee" is stored. In cell C1, the possible response "Yes" is stored. In cell D1, the step (step 3 and spreadsheet cell logically connected to step 3) that should be taken if "Yes" is received is stored. In cell E1 the possible response "No" is stored. The next sequence of steps if "No" is received (step 2 and 3 and the cells logically connected to those steps cell B2 and cell B3) are stored and may both be executed sequentially according to the logic.

The example data in the remainder of the spreadsheet follows the same pattern but will not be specifically described herein and is not intended to be limiting.

In this non-limiting example, the program parses each row in the spreadsheet, one column at a time from left to right starting with column B. In the case where Column B is followed by a textual response (i.e. "Yes", "No", "Self", "Continuous"), the number or numbers to right of the textual response and the cells logically connected to those numbers are treated as the next steps to be completed in the workflow. Further, the programming causes each of the textual responses to be displayed on the graphical user interface with a radio button to the immediate left of the possible textual response. Upon the user's selection of a radio button next to the textual response, the workflow controlled by the decisional matrix moves to the cells that are logically connected to the textual response to the right of the radio button. In the case where there is no text stored in Column B (for example in Row 2), the program may simply open up a text box so that that the user may input additional information called for because of a previous response. Once that input is received, the workflow progresses to the number of the step or steps that is stored and logically connected to the one or more cells to the right of the empty Column C in this example for Row 2.

In row 10, the text may be displayed without any text box being opened because columns C and D are empty and there are no additional steps programmed to occur after the script is displayed. It is notable that the sequence of steps is controlled from row 9 where responsive to a "Yes", the workflow progresses to step 10 (cell B10) and then step 12 (cell B12) and responsive to a "No", the workflow progresses to step 11 (cell B11) and then step 12 (cell B12).

In order to cause the graphical user interface for the call center supplemental workflow tool to display the desired questions and prompts for information for the workflow, the information that is stored in the .json file for cell B1 (step 1) is converted using JavaScript and pulled into the browser and causes the graphical user interface to display question 1 "Are we speaking with the employee?" If the call center employee's response is "Yes", then the decisional matrix moves to the cell logically connected to the "Yes" response which is cell B3 (step 3). In the examples in FIG. 2, FIG. 3, and FIG. 4, the steps of the workflow are shown for when the caller is the employee, however, cells E1, F1, and G1 show the logical programming for when the caller is not the employee. Thus, if the response to the first question is "No", then the decisional matrix moves to the cells logically connected to the "No" response which are B2 and B3. In other words, the logical programming requires that step 2 and then step 3 are executed.

Once the caller information is received (and possibly validated) in the text box, then the decisional matrix moves to the next step 3 which is logically connected to cell B3 causing the graphical user interface to display "Is this for new leave?". If the response is "Yes", then the decisional matrix moves to step 4 and the cell logically connected to the "Yes" response which is B4. However, if the call center employee's response is "No" at step 3, then the decisional matrix moves to step 72 and the cell logically connected with that step. (the text of step 72 and logically connected cell is not shown in FIG. 6). Upon completing step 72 (and possibly other steps), the decisional matrix progresses to step 4 which is logically connected to cell B4.

Returning to step 4 (at cell B4), upon pulling the data corresponding to cell B4, the HTML browser displays to the call center employee the question "What type of leave is this?" If the call center employee enters "Continuous", the decisional matrix moves to step 83 which is the cell logically connected to the "Continuous" response. (the text of step 83 and the logically connected cell is not shown in FIG. 6). Once the sequence and data required in step 83 (and possibly other steps is completed), the decisional matrix moves to cell B6 which is the cell logically connected to step 6. If the call center employee enters "Intermittent", the decisional matrix moves to the cell logically connected to step 13 (The text of step 13 and the logically connected cell are not shown in FIG. 6 due to space constraints). If the call center employee enters "Reduced Work Schedule", the decisional matrix moves to a cell logically connected to the next step. (The text of the step and the logically connected cell are not shown in FIG. 6 due to space constraints).

If the call center employee enters "Yes" at step 3, the decisional matrix moves to cell B4 which is logically connected to step 4 and the graphical user interface displays the text in cell B4 which is "Is this for your own condition or to care for someone else?" If the call center employee enters "Self", then the decisional matrix moves to step 5 which is logically connected to cell B5. If the call center employee enters "Other", then the decisional matrix moves to step 45 (Due to space constraints, the text of step 45 and the cell to which it is logically connected is not shown in FIG. 6).

Returning from step 83 (not shown), the decisional matrix moves to step 6 (cell B6) and causes the graphical user interface to display "May we have your authorization to leave confidential medical and leave information on your personal cell phone?" Whether the response is "Yes" or "No", the decisional matrix moves to step 7 (cell B7) where it causes the graphical user interface to display to the call center employee "Was leave reported timely". If the response is "No", the decisional matrix moves to step 8 (cell B8) causing the graphical user interface to display "Why not timely?" and then, responsive to input from the call center employee, moves to step 9 (Cell B9). If the response at step 8 is "Yes", then the decisional matrix moves to step 9 (cell B9). At step 9, the decisional matrix causes the graphical user interface to display "Documentation other than certification of healthcare provider needed?"

If the call center employee enters "Yes", the decisional matrix progresses to step 10 (cell B10). If the call center employee enters "No", the decisional matrix progresses to step 11 (Cell B11). Both step 10 and 11 cause the graphical user interface to display "Now that we have your information, I will go over a few steps with you . . . " (Due to space constraints an entire script is not shown in FIG. 6) It will be appreciated that any appropriate script may be inserted into cells 10 and 11 stored in the spreadsheet in this example. Once the call center employee completes step 10 or 11, the decisional matrix progresses to step 12 (cell B12) where the browser pulls the data loaded and converted from cell B12 and causes the graphical user interface to display "Did the employee provide the necessary consent to reach out to the provider if clarification or authentication is needed". If the response is "Yes", then the decisional matrix progresses to step 50. If the response is "No", the decisional matrix progresses to step 99. (The text of steps 50 and 99 and the cells logically connected with those steps are not shown in FIG. 6 due to space constraints.)

It will be appreciated that other steps and scripts may certainly follow or precede step 12 and cell B12 and this is not intended to limit the number of steps or type of questions, scripts, and prompts that may be utilized in embodiments.

It is notable that by simply modifying or adding to the information stored in the spreadsheet (i.e. the decisional matrix), then converting the spreadsheet data to an HTML browser compatible format and then loading that data into the HTML browser any desirable sequence of questions, scripts and prompts may be pre-programmed to guide any required workflow (i.e., a call center supplemental workflow). Thus, by modifying or amending the spreadsheet any decision path or multiple decision paths may be constructed and used for controlling the HTML browser display of the graphical user interface used to guide the workflow of the employee.

Figure 7:
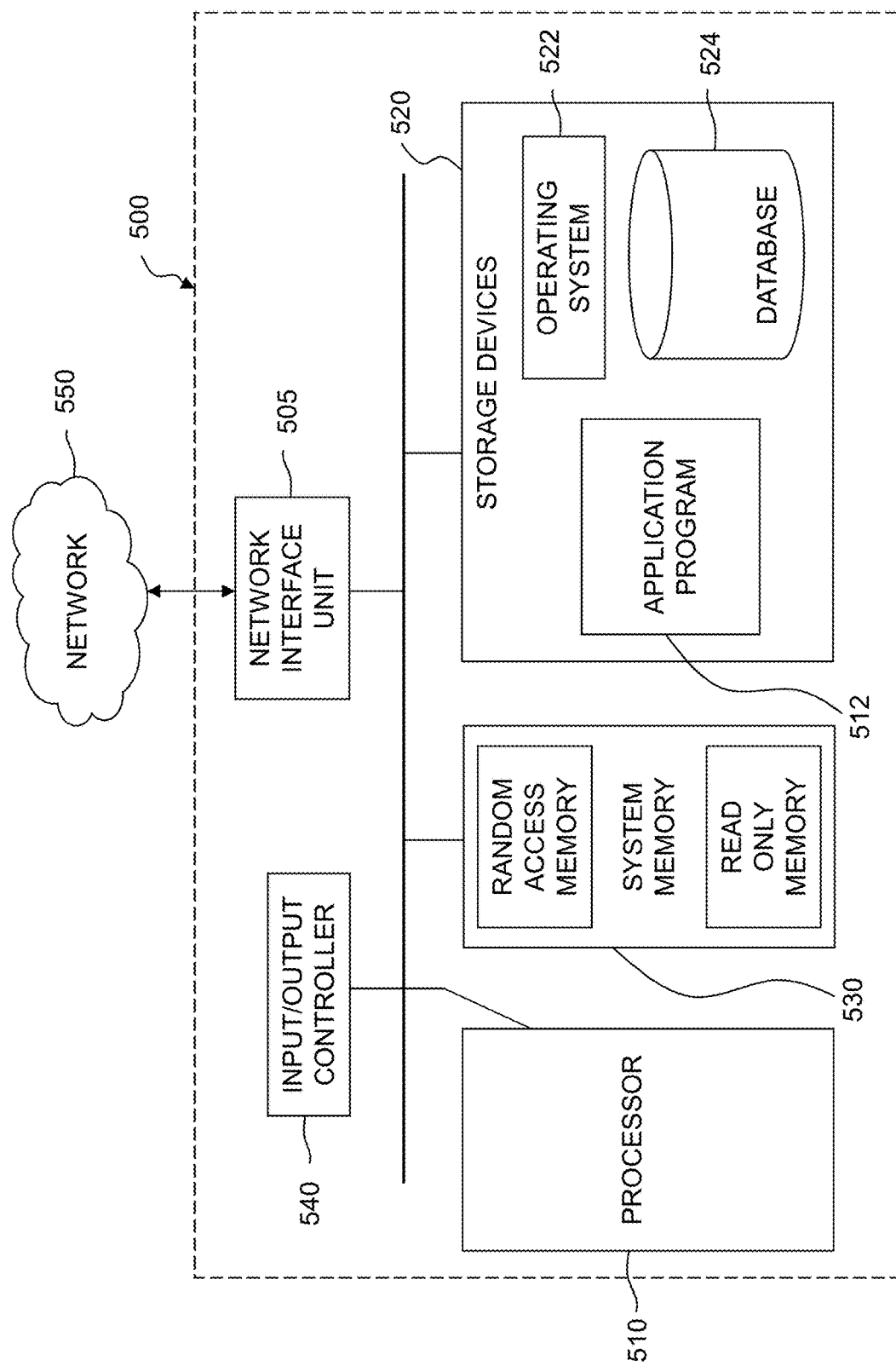
FIG. 7 illustrates an example device for providing a web-based graphical user interface for workflows.

FIG. 7 illustrates an example device according to an embodiment, e.g., a call center employee's desktop computing device. In the example of FIG. 7, a storage device 720 includes software such as a workflow graphical user interface application program 712 that may be run or executed by processor(s) 710 according to an operating system 722. The circuitry 700 provides that the processor 710 loads the operating system 722 and thereafter the application program 712, e.g., into memory 730.

System 700 typically includes a network interface 705 facilitating communications with other devices, e.g., a connection to other devices over a network 750 using components such as a WWAN transceiver, a WLAN transceiver or a wired connection, e.g., a LAN connection. Commonly, system 700 will include an input/output controller 740 for data input and display. System 700 typically includes various memory 730 and storage devices 720, for example a database 724, e.g., for storing data from internal and external data sources, referred to herein.

Figure 8:
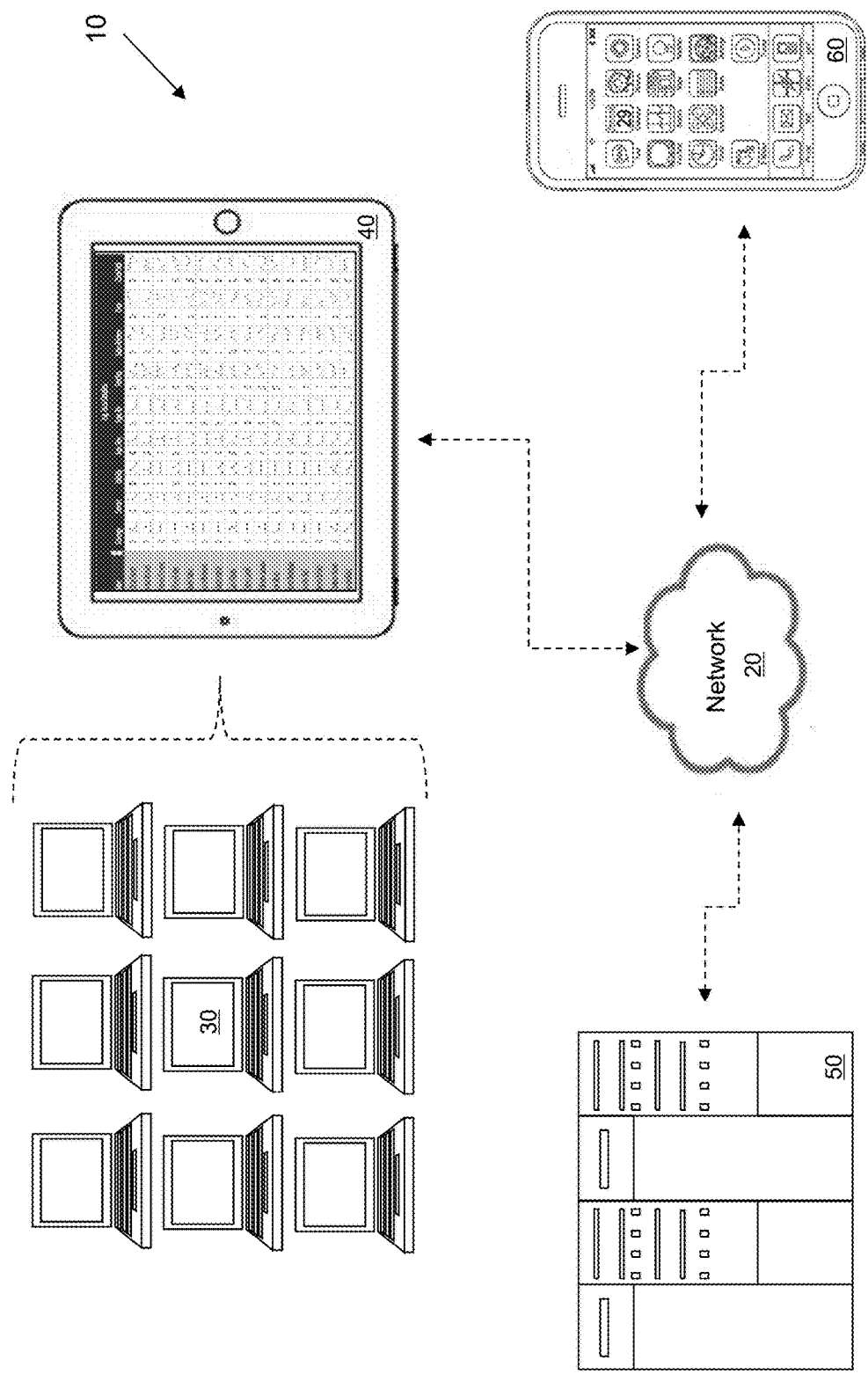
FIG. 8 illustrates an example system for providing a web-based graphical user interface for workflows that is able to support multiple distributed networked centers.

Referring to FIG. 8, there is shown a system 10 for providing a workflow graphical user interface program that is able to support multiple distributed networked centers in accordance with an embodiment of the present invention.

The system 10 is preferably comprised of a communication network 20, a call center 30, a management terminal 40, servers 50, and mobile device 60. Terminal 40 is operable to track and manage call center 30 and provide communications to and from servers 50 and device 60.

Device circuitry, as for example outlined in FIG. 7 and FIG. 8, may be used to generate, manage, and process data collected during the operation of the program providing a graphical user interface for workflow. It will also be apparent that circuitry other than the non-limiting example outlined in FIG. 7 and FIG. 8 may be used.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of an information handling device or other programmable data processing device to produce a machine, such that the instructions, which execute via a processor of the device, implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system having a graphical user interface for providing a call center supplemental web-based workflow tool, the system comprising:
   a display device;
   an input device;
   a database that stores a decisional matrix in a non-web format, the decisional matrix describing a plurality of decisional paths and comprising a plurality of questions and a plurality of scripts related to an employee management workflow; and
   a processor coupled to the database, the display device, and the input device;
   the display device providing a web-based graphical user interface for providing a call center supplemental workflow tool;
   wherein the processor receives from the database a web decisional matrix comprising the decisional matrix in a web format and comprising the plurality of questions and the plurality of scripts, wherein receiving the web decisional matrix comprises converting the decisional matrix in the non-web format to a web format comprising components loadable by a web-based browser, wherein the web decisional matrix is updatable by modifying the decisional matrix in the non-web format and converting the modified decisional matrix to the web format;
   the graphical user interface providing at least one element selected from the group consisting of: at least one question selected from the plurality of questions and at least one script selected from the plurality of scripts, wherein the at least one element that is provided is determined via the web decisional matrix and provided in a prompt format identified by the web decisional matrix;
   the graphical user interface receiving user input through the input device responsive to the at least one element;
   the processor validating the user input, wherein the validating comprises comparing a format of the user input to a predetermined format corresponding to the prompt format; and
   the display device displaying at least another element selected from the group consisting of: another at least one question and another at least one script on the graphical user interface, wherein the at least another element is determined based upon correlating the received user input to the workflow within the web decisional matrix and identifying an element occurring within the workflow after the element corresponding to the received user input.

2. The system according to claim 1, wherein, if the at least one element is changed in the decisional matrix, the graphical user interface is updated to display the changed element.

3. The system according to claim 1, wherein, if additional input is required according to the decisional matrix, the graphical user interface displays a prompt for the additional input.

4. The system according to claim 1, wherein user input is validated against at least one element selected from the group consisting of: the decisional matrix and at least one other database of acceptable input.

5. The system according to claim 1, wherein a notification is provided to the user when user input is required.

6. The system according to claim 1, wherein a notification is provided to the user when the user input is not valid.

7. The system according to claim 1, wherein the output is transmitted to another system.

8. The system according to claim 1, wherein the output is organized with the user input corresponding to a particular question below the corresponding question.

9. The system according to claim 8, wherein the output is unformatted text.

10. A method providing a web-based graphical user interface for providing an employee management call center supplemental workflow tool, comprising:
   receiving, from a database, a decisional matrix, the decisional matrix describing a plurality of decisional paths and comprising a plurality of questions and a plurality of scripts related to the employee management call center workflow, wherein the decisional matrix is stored in the database in a non-web format, wherein receiving the decisional matrix comprises receiving a web decisional matrix comprising the decisional matrix in a web format for display, wherein receiving the web decisional matrix comprises converting the decisional matrix in the non-web format to a web format comprising components loadable by a web-based browser, wherein the web decisional matrix is updatable by modifying the decisional matrix in the non-web format and converting the modified decisional matrix to the web format;
   displaying a web-based graphical user interface on a display and within the web-based browser, the web-based graphical user interface providing at least one element selected from the group consisting of: at least one question selected from the plurality of questions and at least one script selected from the plurality of scripts, wherein the at least one element that is provided is determined via the web decisional matrix and provided in a prompt format identified by the web decisional matrix;
   receiving, at the web-based graphical user interface, user input responsive to the at least one element;
   validating the user input, wherein the validating comprises comparing a format of the user input to a predetermined format corresponding to the prompt format; and
   displaying at least another element selected from the group consisting of: another at least one question and another at least one script, wherein the at least another element is determined based upon correlating the received user input to the workflow within the web decisional matrix and identifying an element occurring within the workflow after the element corresponding to the received user input.

11. The method according to claim 10, wherein if the at least one element is changed in the decisional matrix, the web-based graphical user interface is updated to display the changed element.

12. The method according to claim 10, wherein, if additional input is required according to the decisional matrix, the web-based graphical user interface displays a prompt for the additional input.

13. The method according to claim 10, wherein user input is validated against at least one element selected from the group consisting of: the decisional matrix and at least one other database of acceptable input.

14. The method according to claim 10, wherein a notification is provided to the user when user input is required.

15. The method according to claim 10, wherein the output is organized with the user input corresponding to a particular question below the corresponding question.

16. The system according to claim 15, wherein the output is unformatted text.

17. A system having a graphical user interface for providing an employee management call center supplemental workflow tool comprising:
- a database comprising a decisional matrix in a non-web format, the decisional matrix describing a plurality of decisional paths and comprising a plurality of questions and a plurality of scripts related to an employee management workflow;
- a display device providing a web-based graphical user interface, wherein the web-based graphical user interface provides at least one element selected from the group consisting of: at least one question selected from the plurality of questions and at least one script selected from the plurality of scripts, wherein the web-based graphical user interface accesses the workflow decisional matrix in a web format for display within a web-based browser, wherein the web format is generated by converting the decisional matrix in the non-web format to a web format comprising components loadable by the web-based browser and wherein the web format is updatable by modifying the decisional matrix in the non-web format and converting the modified decisional matrix to the web format, wherein the at least one element is provided in a prompt format identified by the decisional matrix;
- the graphical user interface receiving user input responsive to the at least one element; and
- a processor validating the user input, wherein the validating comprises comparing a format of the user input to a predetermined format of the prompt format; and
- the display device display, within the web-based graphical user interface, at least another element selected from the group consisting of: another at least one question and another at least one script, wherein the at least another element is determined based upon correlating the received user input to the workflow within the decisional matrix and identifying an element occurring within the workflow after the element corresponding to the received user input and advances the workflow, wherein the at least another element is provided sequentially after receipt of the user input responsive to a previously presented at least one element.

18. The system according to claim 17, wherein, if the at least one element is changed in the decisional matrix, the web-based graphical user interface is updated to display the changed element.

19. The system according to claim 17, wherein the output is unformatted text.

20. The system according to claim 17, wherein the output is organized with the user input corresponding to a particular question below the corresponding question.

* * * * *